United States Patent
Bloom et al.

(10) Patent No.: US 9,529,679 B2
(45) Date of Patent: Dec. 27, 2016

(54) VOLUME SNAPSHOT IN A SHARED ENVIRONMENT

(71) Applicant: Verizon Patent and Licensing Inc., Basking Ridge, NJ (US)

(72) Inventors: Jeffrey M. Bloom, Bellingham, MA (US); Alex Iannicelli, Andover, MA (US); Kishore Chitrapu, Shrewsbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 309 days.

(21) Appl. No.: 14/078,875

(22) Filed: Nov. 13, 2013

(65) Prior Publication Data

US 2015/0134617 A1    May 14, 2015

(51) Int. Cl.
- *G06F 17/00* (2006.01)
- *G06F 7/00* (2006.01)
- *G06F 11/14* (2006.01)

(52) U.S. Cl.
CPC ....... *G06F 11/1464* (2013.01); *G06F 11/1448* (2013.01); *G06F 2201/84* (2013.01)

(58) Field of Classification Search
CPC .................. G06F 17/30088; G06F 17/30203; G06F 2201/84; G06F 17/30194; G06F 17/30575; G06F 11/1446
See application file for complete search history.

(56) References Cited

U.S. PATENT DOCUMENTS

| | | | | |
|---|---|---|---|---|
| 8,789,208 B1* | 7/2014 | Sundaram | ............... | H04L 29/06 726/28 |
| 2007/0283111 A1* | 12/2007 | Berkowitz | ............ | G06F 3/0601 711/162 |
| 2011/0047340 A1* | 2/2011 | Olson | ................. | G06F 11/1456 711/162 |
| 2011/0106763 A1* | 5/2011 | Madan | ................ | G06F 11/2094 707/639 |
| 2012/0179824 A1* | 7/2012 | Jackson | ................ | G06F 9/5027 709/226 |
| 2013/0007183 A1* | 1/2013 | Sorenson, III | ........ | G06F 3/0607 709/213 |

(Continued)

OTHER PUBLICATIONS

Amazon Web Services, Inc., "Amazon Elastic Block Store (EBS)—Persistent Storage", Aug. 21, 2008, 4 pages.

(Continued)

*Primary Examiner* — Dung K Chau

(57) ABSTRACT

A system may receive information associated with a write operation to be performed on a data volume. The data volume may be maintained by one or more cloud resources within a cloud computing environment. The system may determine that a snapshot of the data volume is to be created based on receiving the information associated with the write operation. The system may generate a snapshot command based on determining that the snapshot is to be created. The system may create snapshots at the one or more cloud resources based on the snapshot command. The snapshot command may be issued at each of the one or more cloud resources to cause the snapshots to be consistent across the one or more cloud resources. The system may store the snapshots.

20 Claims, 11 Drawing Sheets

(56) References Cited

U.S. PATENT DOCUMENTS

| | | | | |
|---|---|---|---|---|
| 2013/0007219 A1* | 1/2013 | Sorenson, III | ...... | H04L 67/1095 |
| | | | | 709/219 |
| 2013/0031308 A1* | 1/2013 | De Spiegeleer | ...... | G06F 3/0604 |
| | | | | 711/122 |
| 2013/0054890 A1* | 2/2013 | Desai | ................... | G06F 3/0604 |
| | | | | 711/114 |
| 2013/0054910 A1* | 2/2013 | Vaghani | ................. | G06F 3/061 |
| | | | | 711/162 |
| 2013/0282662 A1* | 10/2013 | Kumarasamy | ......... | G06F 11/14 |
| | | | | 707/649 |

OTHER PUBLICATIONS

Amazon Web Services, Inc., "Creating an Amazon EBS Snapshot—Amazon Elastic Compute Cloud", May 14, 2013, 2 pages.

* cited by examiner

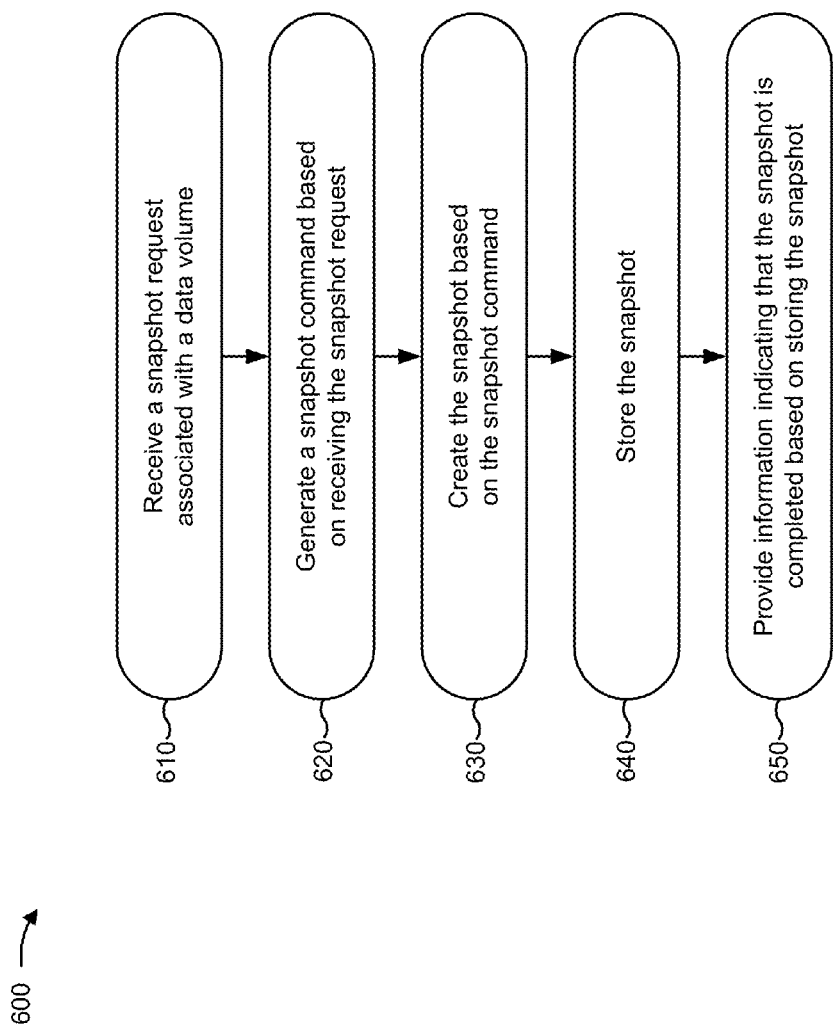

VOLUME SNAPSHOT IN A SHARED ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Customers may buy these computing resources and use the computing resources on an on-demand basis. Cloud computing environments provide services that do not require end-user knowledge of a physical location and configuration of a system that delivers the services.

BRIEF DESCRIPTION OF THE DRAWINGS

FIG. 6 is a flow chart of an example process for creating and storing a snapshot based on a snapshot command;

DETAILED DESCRIPTION

The following detailed description of example implementations refers to the accompanying drawings. The same reference numbers in different drawings may identify the same or similar elements.

A service provider may provide a cloud computing service to a user based on a service level agreement ("SLA") between the service provider and the user. The SLA may provide for one or more protection schemes designed to protect data associated with the user, such as replication, redundant array of independent disks ("RAID"), erasure coding, continuous data protection, mirroring, disk cloning, or the like. The protection schemes included the SLA may allow the user to create one or more data volumes (e.g., one or more locations that store a copy of data associated with the user) within a cloud computing environment, and may describe a manner in which the one or more data volumes are to be managed by the cloud computing service (e.g., to prevent data corruption, to preserve data integrity, to allow for cloning of the data volume, etc.). One manner in which the data volumes may be managed is by regularly creating and storing a snapshot of each of the one or more data volumes (e.g., each time data is written, each time data is altered, once an hour, once a day, etc.). The service provider may wish for each snapshot to be created such that a first snapshot, associated with a first data volume, is identical to a second snapshot associated with a second data volume (e.g., when each data volume is configured to maintain the same user data). While implementations described herein use data replication as an example of a protection scheme, in other implementations, the systems and/or methods described may also be applied to other protection schemes (e.g., RAID, erasure coding, etc.)

Implementations described herein may allow a cloud computing service provider to synchronize, via a data link protocol layer associated with a cloud computing environment, the creation of one or more snapshots of one or more data volumes associated with a user. In this way, any synchronized snapshot of a data volume, associated with the user, may be identical to any other synchronized snapshot of any other data volume associated with the user.

Figure 1A:
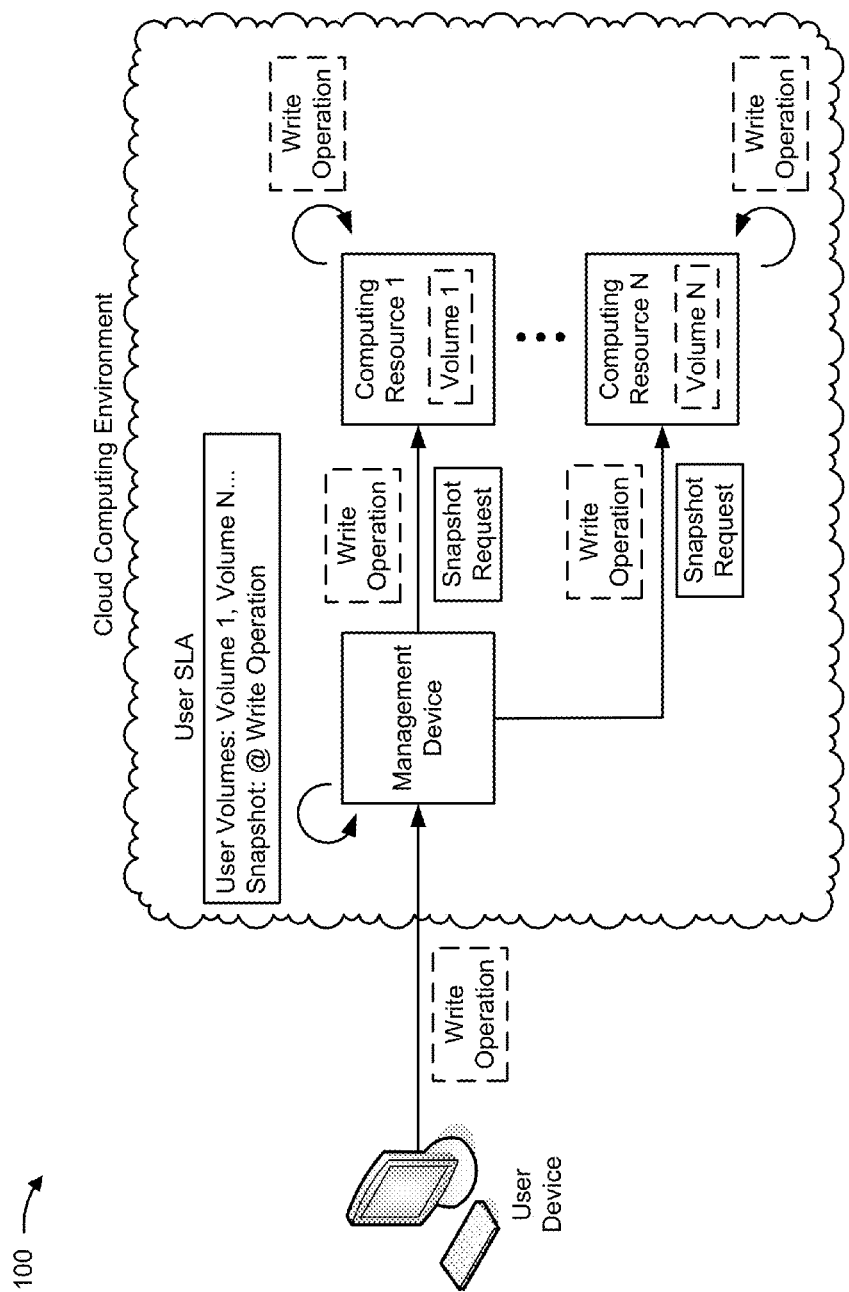
FIGS. 1A and 1B are diagrams of an overview of an example implementation described herein.
Figure 1B:
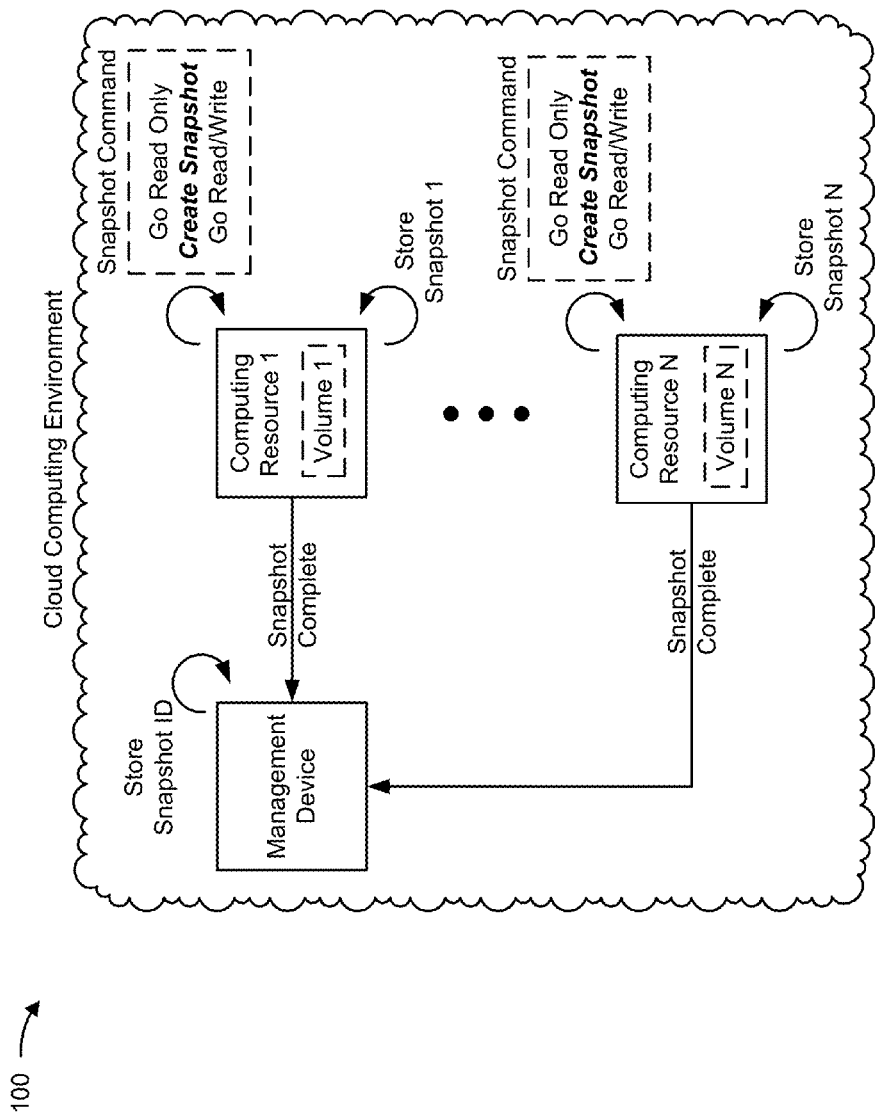

FIGS. 1A and 1B are diagrams of an overview of an example implementation 100 described herein. For the purposes of example implementation 100, assume that a user, associated with a user device, has entered into an SLA with a service provider, associated with a cloud computing service, that allows the user to create a quantity of N data volumes (e.g., N sets of user data maintained in N storage volumes) within a cloud computing environment associated with the cloud computing service.

As shown in FIG. 1A, the user device may send information, associated with a write operation (e.g., a data write associated with modifying user data), to a management device included in the cloud computing environment. As shown, the management device may receive the information associated with write operation, and may determine information associated with the SLA between the user and the service provider. As further shown, the SLA may indicate that N data volumes (e.g., volume 1 through volume N (N>1)), associated with the user, are maintained (e.g., by computing resource 1 through computing resource N) within the cloud computing environment. As also shown, the SLA may indicate that a snapshot of each data volume is required to be created each time a write operation, associated with user, takes place.

As further shown in FIG. 1A, the management device may forward the information associated with the write operation and send information indicating that a snapshot is to be created (e.g., a snapshot request) to each of the N computing resources. As further shown, each of the N computing resources may receive the information associated with the write operation, and may perform the write operation associated with each data volume maintained by each computing resource.

As shown in FIG. 1B, each of the N computing resources may (e.g., after performing the write operation) generate and execute a snapshot command. As shown, the snapshot command, associated with each of the N computing resources, may include information indicating that the computing resource is instructed to enter into a read-only mode (e.g., to prevent further write operations from taking place while the snapshot is being created), may include information indicating that the snapshot is to be created, and may include information indicating that the computing resource may enter into a read-write mode (e.g., to allow additional write operations after the snapshot is created). As shown, computing resource 1 may create a snapshot of volume 1, computing resource N may create a snapshot of volume N, and so on, based on the snapshot command associated with each of the N computing resources.

As further shown in FIG. 1B, each of the N computing resources may store the snapshot (e.g., in a storage volume that is not associated with maintaining a user data volume). As shown, each of the N computing resources may provide, to the management device, information indicating that the snapshot (e.g., associated with each computing resource) is complete, and the management device may store information that identifies the completed snapshot. In this way, a cloud computing service provider may synchronize the creation of one or more snapshots of one or more data volumes associated with a user (e.g., such that a snapshot of a data volume matches any other synchronized snapshot of any other data volume).

Figure 2:
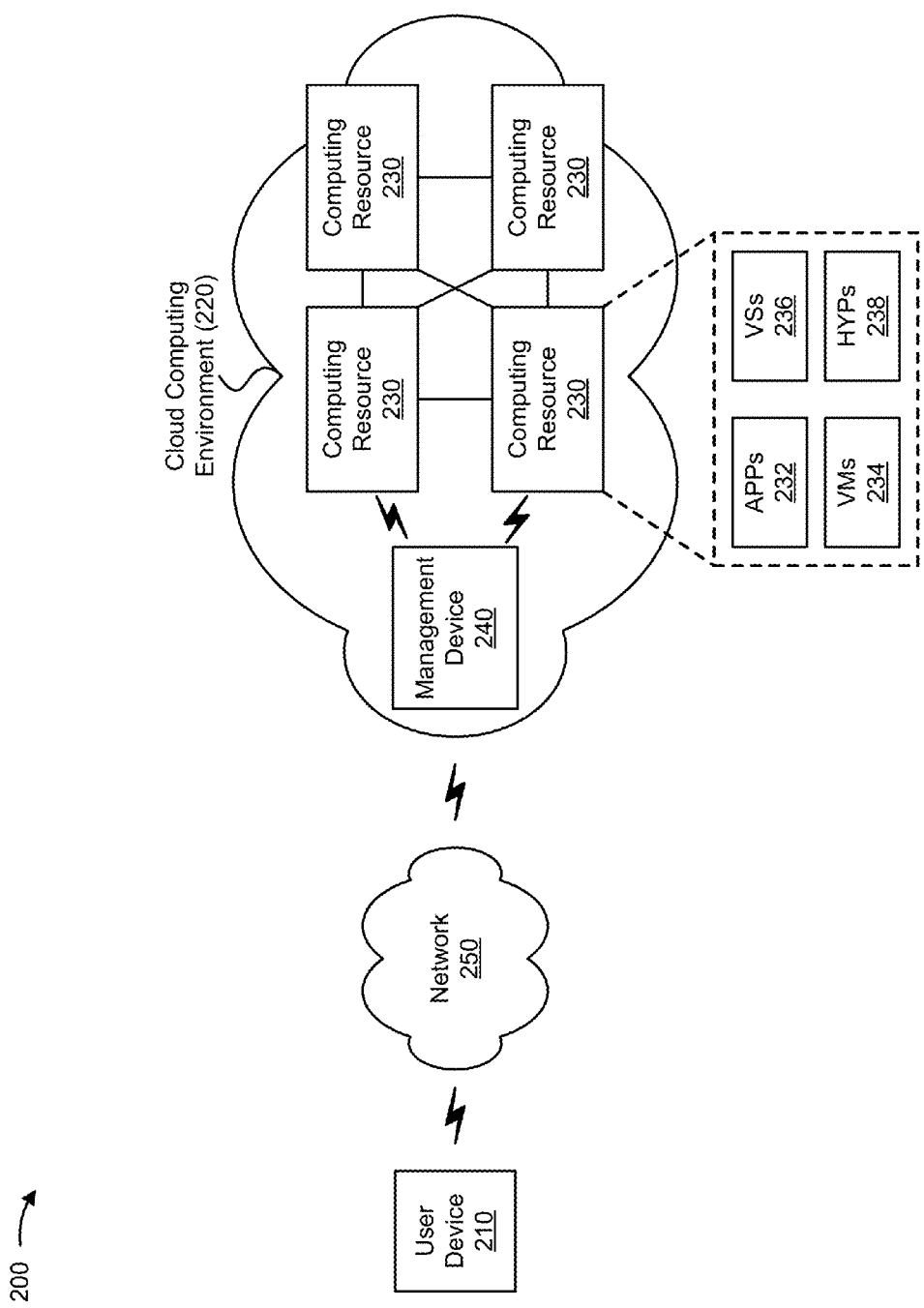
FIG. 2 is a diagram of an example environment in which systems and/or methods described herein may be implemented.

FIG. 2 is a diagram of an example environment 200 in which systems and/or methods described herein may be implemented. As shown, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant ("PDA"), and/or another similar type of computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230") and a management device 240.

Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections. In some implementations, one or more computing resources 230 may be assigned (e.g., by a device associated with the cloud computing service provider, etc.) to process traffic, associated with a user, in accordance with an SLA. In some implementations, computing resource 230 may receive, process, and/or store user information (e.g., user data) received from user device 210. In some implementations, computing resource 230 may be assigned to receive, process, and/or store user information associated with one or more users of the cloud computing service.

As further shown in FIG. 2, computing resource 230 may include a group of cloud resources, such as one or more applications ("APPs") 232, one or more virtual machines ("VMs") 234, virtualized storage ("VSs") 236, one or more hypervisors ("HYPs") 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system ("OS"). A process virtual machine may execute a single program, and may support a single process. In some implementations, virtual machine 234 may execute on behalf of a user (e.g., user device 210), and may manage infrastructure of cloud computing environment 220, such as data management, synchronization, or long-duration data transfers.

Virtualized storage 236 may include one or more storage systems and/or one or more devices that use virtualization techniques within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service provided by cloud computing environment 220.

Management device 240 may include a device capable of managing cloud computing environment 220 and/or one or more computing resources 230. For example, management device 240 may include a server, a gateway, a router, a modem, a switch, a firewall, a network interface card ("NIC"), a hub, a bridge, an optical add/drop multiplexer ("OADM"), or the like. In some implementations, management device 240 may include a device capable of receiving user information (e.g., from user device 210) and providing the user information to computing resource 230 for processing, storage, etc. In some implementations, management device 240 may be capable of storing an SLA associated with user device 210 and/or cloud computing environment 220. While shown as being located external to computing resource 230, management device 240 may be may be implemented within one or more computing resources 230 and/or one or more components of computing resource 230 (e.g., application 232, virtual machine 234, virtualized storage 236, hypervisor 238, etc.). Alternatively, management device 240 may be included within another device associated with cloud computing environment 220.

Network 250 may include a network, such as a local area network ("LAN"), a wide area network ("WAN"), a metropolitan area network ("MAN"), a telephone network, such as the Public Switched Telephone Network ("PSTN") or a cellular network, an intranet, the Internet, a fiber-optic based network, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Figure 3:
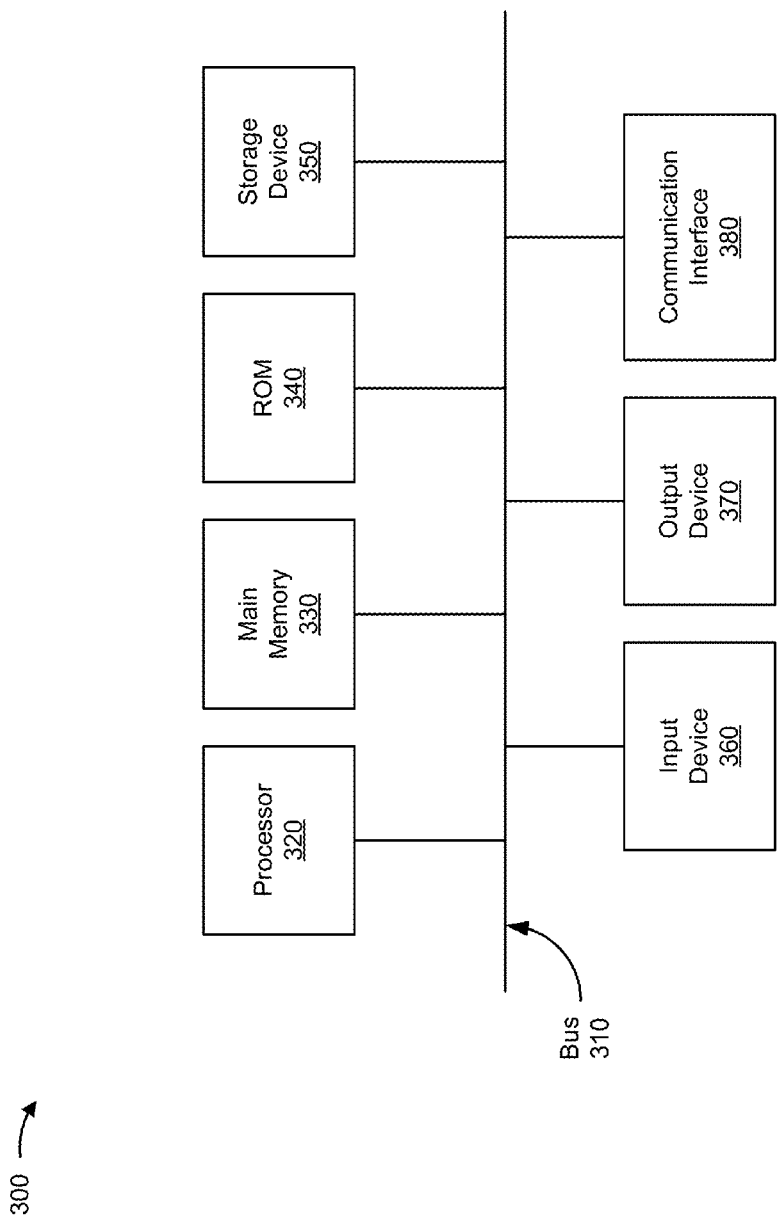
FIG. 3 is a diagram of example components of one or more devices of FIG. 2.

FIG. 3 is a diagram of example components of a device 300. Device 300 may correspond to user device 210, computing resource 230, and/or management device 240. In some implementations, each of user device 210, computing resource 230, and/or management device 240 may include one or more devices 300 and/or one or more components of device 300.

As shown in FIG. 3, device 300 may include a bus 310, a processor 320, a main memory 330, a read-only memory ("ROM") 340, a storage device 350, an input device 360, an output device 370, and/or a communication interface 380. Bus 310 may include a path that permits communication among the components of device 300.

Processor 320 may include one or more processors, microprocessors, application-specific integrated circuits ("ASICs"), field-programmable gate arrays ("FPGAs"), or other types of processors that may interpret and execute instructions. Main memory 330 may include one or more random access memories ("RAMs") or other types of dynamic storage devices that may store information and/or instructions for execution by processor 320. ROM 340 may include one or more ROM devices or other types of static storage devices that may store static information and/or instructions for use by processor 320. Storage device 350 may include a magnetic and/or optical recording medium and a corresponding drive.

Input device 360 may include a component that permits a user to input information to device 300, such as a keyboard, a camera, an accelerometer, a gyroscope, a mouse, a pen, a microphone, voice recognition and/or biometric components, a remote control, a touch screen, a neural interface, etc. Output device 370 may include a component that outputs information from device 300, such as a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processor 320 executing software instructions contained in a computer-readable medium, such as main memory 330. A computer-readable medium may be defined as a non-transitory memory device. A memory device may include memory space within a single physical storage device or memory space spread across multiple physical storage devices.

The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
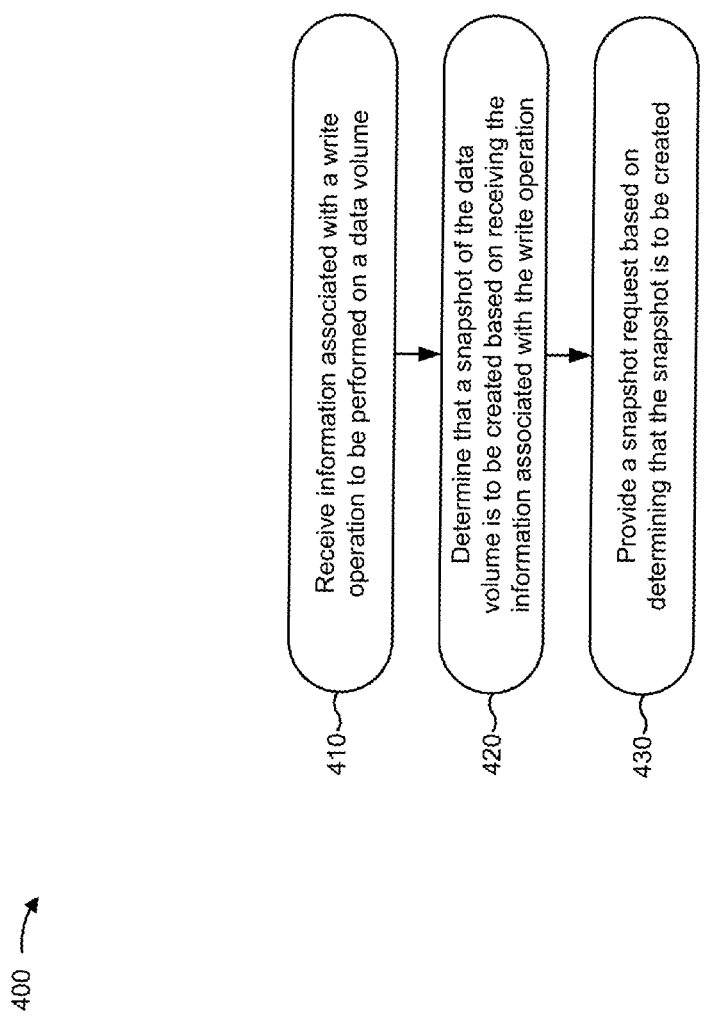
FIG. 4 is a flow chart of an example process for providing a snapshot request based on receiving information associated with a write operation.

FIG. 4 is a flow chart of an example process 400 for providing a snapshot request based on receiving information associated with a write operation. In some implementations, one or more process blocks of FIG. 4 may be performed by management device 240. In some implementations, one or more process blocks of FIG. 4 may be performed by another device or a group of devices separate from or including management device 240, such as computing resource 230.

As shown in FIG. 4, process 400 may include receiving information associated with a write operation to be performed on a data volume (block 410). For example, management device 240 may receive, from user device 210, information associated with a write operation to be performed on a data volume maintained by computing resource 230. In some implementations, management device 240 may receive the information associated with the write operation when user device 210 provides the information associated with the write operation. Additionally, or alternatively, management device 240 may receive the information associated with the write operation when a user, associated with user device 210, causes user device 210 to send the information, associated with the write operation, to management device 240.

The information associated with write operation may include information, provided by user device 210 accessing cloud computing environment 220, that indicates that user information (e.g., user data, etc.), associated with user device 210, may be written to a data volume (e.g., a storage volume, a memory location, a RAM, a hard disk, etc.) maintained in cloud computing environment 220.

In some implementations, the information associated with the write operation may include information identifying user device 210 and/or a user associated with user device 210. For example, the information associated with the write operation may include a user device identifier associated with user device 210, such as a string of characters, a user device identification ("ID") number, or the like. Additionally, or alternatively, the information associated with the write operation may include information associated with an SLA associated with the user and/or user device 210. For example, the information associated with the write operation may include information that identifies an SLA (e.g., an SLA identifier) between the user of user device 210 and a service provider associated with cloud computing environment 220 (e.g., and management device 240 may identify a data volume based on terms of the SLA associated with the SLA identifier). Additionally, or alternatively, the information associated with the write operation may include information associated with a data volume, associated with user device 210 and/or computing resource 230, that may be modified by the write operation. For example, the information associated with the write operation may include information that identifies a data volume (e.g., a data volume ID) associated with a data volume maintained by a particular computing resource 230, that may be modified based on the write operation.

As further shown in FIG. 4, process 400 may include determining that a snapshot of the data volume is to be created based on receiving the information associated with the write operation (block 420). For example, management device 240 may determine that a snapshot of the data volume, maintained by computing resource 230, is to be created based on receiving the information associated with the write operation from user device 210. In some implementations, management device 240 may determine that the snapshot of the data volume is to be created when management device receives the information associated with the write operation from user device 210. Additionally, or alternatively, management device 240 may determine that the snapshot of the data volume is to be created when management device 240 receives information, indicating that the snapshot is to be created from another device, such as computing resource 230.

A snapshot may include information that identifies the state (e.g., stored information) of a data volume at a particular point in time. The snapshot may include a set of reference markers associated with the data volume, stored on computing resource 230, that may streamline access to the data volume (e.g., when a user wishes to clone the data volume) and/or may allow the data volume be recovered (e.g., when the data volume is corrupted, etc.).

In some implementations, management device 240 may determine that the snapshot of the data volume is to be created based on information stored by management device 240. For example, management device 240 may receive, from user device 210, the information associated with the write operation, may identify (e.g., based on information stored by management device 240) an SLA associated with user device 210, and may determine that the snapshot of the data volume is to be created based on information associated with the SLA. In some implementations, the SLA may indicate that the snapshot is to be created based on receiving the information associated with the write operation (e.g., when the SLA indicates that the snapshot is to be created after each write operation is performed, when the SLA indicates that the snapshot is to be created after every tenth write operation is performed, etc.). Additionally, or alternatively, the SLA may indicate that the snapshot is to be created at a particular interval of time (e.g., every 30 minutes, every 24 hours, etc.).

In some implementations, management device 240 may determine that the snapshot is to be created based on information received by management device 240. For example, management device 240 may determine that the snapshot is to be created based on information received from another device associated with cloud computing environment 220 (e.g., when an administrator, associated with cloud computing environment 220, indicates that the snapshot is to be created, etc.). As an additional example, management device 240 may determine that the snapshot is to be created based on information, received from user device 210, indicating that the user requests the snapshot to be created (e.g., when the user may request a snapshot be created after performing the write operation, etc.).

In some implementations, management device 240 may determine (e.g., based on the information stored by management device 240, based on information received from user device 210, etc.) that a group of data volumes, associated with user device 210, is included in cloud computing environment 220, and management device 240 may determine that a snapshot, associated with each data volume of the group of data volumes is to be created (e.g., such that a snapshot of each data volume, associated with user device 210, may be created).

As further shown in FIG. 4, process 400 may include providing a snapshot request based on determining that the snapshot is to be created (block 430). For example, management device 240 may provide a snapshot request based on determining that the snapshot (e.g., of the data volume maintained by computing resource 230) is to be created. In some implementations, management device 240 may provide the snapshot request when management device determines that the snapshot is to be created (e.g., after management device determines that the snapshot is to be created). Additionally, or alternatively, management device 240 may provide the snapshot request when management device 240 receives information, indicating that management device 240 may provide the snapshot request, from another device, such as computing resource 230.

A snapshot request may include a request, generated by management device 240, that includes information indicating that cloud computing device 230 is to create a snapshot of a data volume (e.g., a data volume maintained by computing resource 230). In some implementations, the snapshot request may include information that identifies the data volume, such as a data volume ID (e.g., a string of characters that identifies the data volume). Additionally, or alternatively, the snapshot request may include information that identifies computing resource 230. Additionally, or alternatively, the snapshot request may include information identifying user device 210 and/or the user of user device 210 (e.g., such that computing resource 230 may identify the data volume, associated with the user, maintained by computing resource 230).

In some implementations, management device 240 may provide the snapshot request based on information stored by management device 240. For example, management device 240 may store information that identifies a data volume associated with user device 210, and management device 240 may provide a snapshot request based on the information that identifies the data volume. As an additional example, management device 240 may store information that identifies computing resource 230 (e.g., associated with the data volume), and may provide the snapshot request based on the information that identifies computing resource 230. In some implementations, management device 240 may provide the snapshot request, and may also forward the information associated with the write operation (e.g., such that the snapshot request is received by computing resource 230 after the information associated with the write operation is received by computing resource 230).

In some implementations, management device 240 may provide a group of snapshot requests (e.g., when a group of data volumes, associated with user device 210, are maintained by one or more computing resources 230, management device 240 may provide a snapshot request to each of the one or more computing resources 230).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
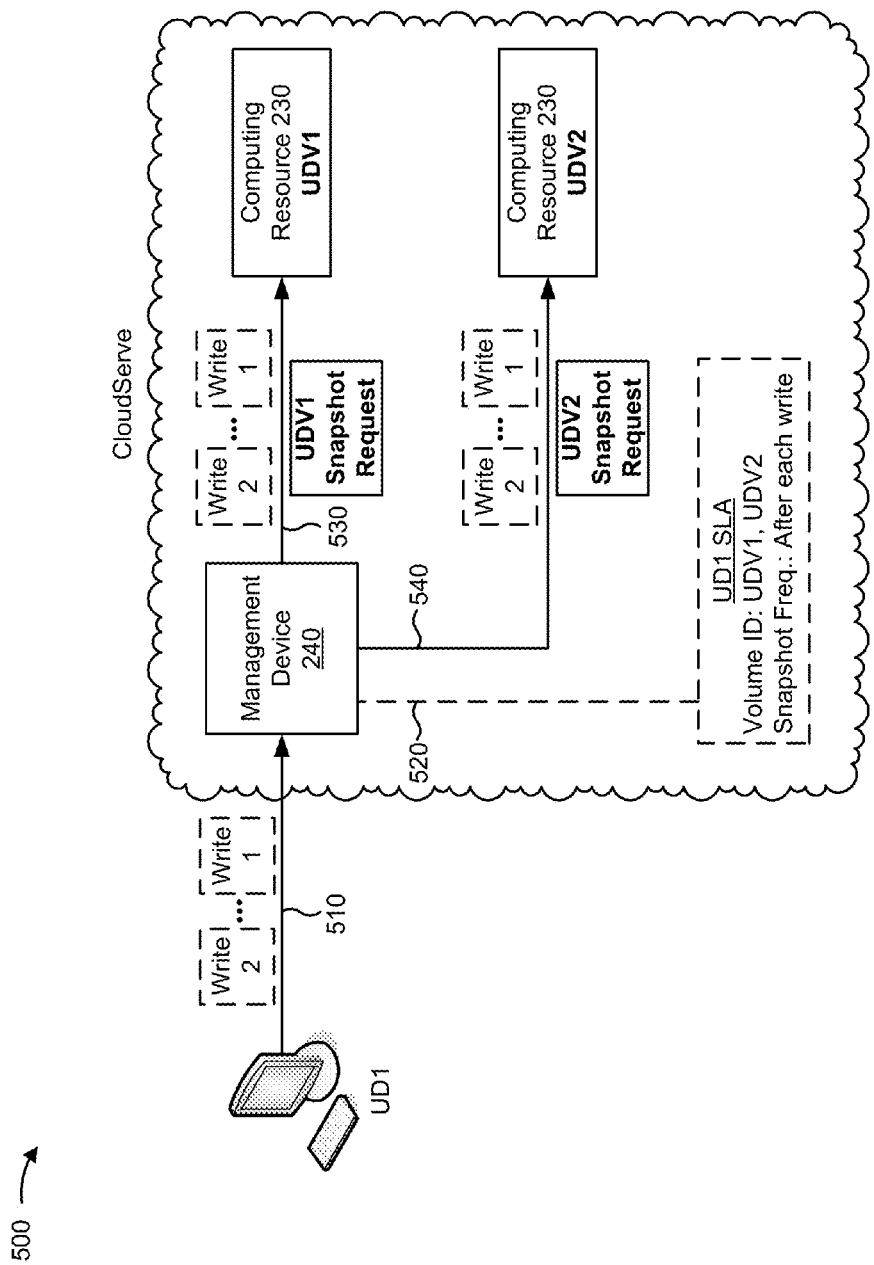
FIG. 5 is a diagram of an example implementation relating to the example process shown in FIG. 4.

FIG. 5 is a diagram of an example implementation 500 relating to example process 400 shown in FIG. 4. For the purpose of example implementation 500, assume that a user of a user device, UD1, has entered into an SLA with a cloud computing service provider associated with a cloud computing environment, CloudServe. Further, assume that the SLA indicates that CloudServe may maintain two data volumes (e.g., two identical storage volumes) to protect user data, associated with the user, from a failure associated with the two storage volumes (e.g., data corruption, data loss, etc.). Finally, assume that the user (e.g., via UD1) wishes to perform a first write operation and a second write operation that may modify the user data maintained by CloudServe.

As shown in FIG. 5, and by reference number 510, management device 240 may receive, from UD1, information associated with a first write operation (e.g., Write 1), and information associated with a second write operation (e.g., Write 2). As shown by reference number 520, management device 240 may determine, based on receiving the information associated with Write 1, SLA information associated with UD1. As shown, the SLA information may indicate that CloudServe maintains two data volumes associated with UD1, identified as UDV1 and UDV2. As further shown, the SLA may indicate that a snapshot of each data volume is to be created after each write operation, associated with each data volume, is performed.

As further shown in FIG. 5, and by reference number 530, management device 240 may provide a snapshot request to a first computing resource 230, associated with the UDV1 data volume. As further shown, management device 240 may also forward, to the first computing resource 230, the information associated with Write 1 and Write 2. Management device 240 may also provide a snapshot request associated with creating a snapshot after the second write operation is performed.

As shown by reference number 540, management device 240 may provide a snapshot request to a second computing resource 230, associated with the UDV2 data volume. As further shown, management device 240 may also forward, to the second computing resource 230, the information associated with Write 1 and Write 2. Management device 240 may also provide a snapshot request associated with creating a snapshot after the second write operation is performed.

As indicated above, FIG. 5 is provided merely as an example. Other examples are possible and may differ from what was described with regard to FIG. 5.

FIG. 6 is a flow chart of an example process 600 for creating and storing a snapshot based on a snapshot command. In some implementations, one or more process blocks of FIG. 6 may be performed by computing resource 230 and/or one or more components of computing resource 230. In some implementations, one or more process blocks of FIG. 6 may be performed by another device or a group of devices separate from or including computing resource 230, such as management device 240.

As shown in FIG. 6, process 600 may include receiving a snapshot request associated with a data volume (block 610). For example, computing resource 230 may receive a snapshot request associated with a data volume maintained by computing resource 230. In some implementations, computing resource 230 may receive the snapshot request from management device 240 (e.g., after management device 240 provides the snapshot request). Additionally, or alternatively, computing resource 230 may receive the snapshot request from another device associated with cloud computing environment 220.

As further shown in FIG. 6, process 600 may include generating a snapshot command based on receiving the snapshot request (block 620). For example, computing resource 230 (e.g., hypervisor 238) may generate a snapshot command based on receiving the snapshot request. In some implementations, computing resource 230 may generate the snapshot command when computing resource 230 receives the snapshot request, associated with the data volume, from management device 240. Additionally, or alternatively, computing resource 230 may generate the snapshot command when computing resource 230 receives information, indicating that computing resource 230 is to generate the snapshot command, from another device (e.g., another device associated with cloud computing environment 220).

A snapshot command may include a group of one or more instructions indicating that computing resource 230 is required to create a snapshot of a data volume maintained by computing resource 230. In some implementations, the snapshot command may include instructions associated with ensuring the snapshot is created identically across one or more data volumes. For example, the snapshot command may include instructions indicating that computing resource 230 is required to enter into a "read-only" mode (e.g., after performing the write operation and before taking the snapshot), create the snapshot, and enter into a "read-write" mode after the snapshot is created. In some implementations, the snapshot command may include a snapshot identifier. A snapshot identifier may include information (e.g., a string of characters, a snapshot ID number, a timestamp associated with storing the snapshot, a cookie associated with storing the snapshot, etc.) that identifies the snapshot that is to be created and stored by computing resource 230 (e.g., each computing resource 230 may use the same identifier when storing a snapshot of each data volume).

In some implementations, computing resource 230 may insert the snapshot command into a data stream that includes the information associated with the write operation. For example, computing resource 230 (e.g., hypervisor 238) may generate the snapshot command, and may insert the snapshot command into a data stream associated with the data volume (e.g., hypervisor 238 may insert the snapshot command into a data stream that includes the information associated with the write operation and one or more other read and/or write requests). In some implementations, computing resource 230 may insert the snapshot command into the data stream immediately after the information associated with the write operation (e.g., such that the write operation may be performed before the snapshot is created). In this way, the snapshot command may cause the snapshot to be created (e.g., by one or more computing resources 230 that received the snapshot request) such that the snapshot is identical to another snapshot associated with another data volume (e.g., each snapshot, associated with each data volume, will be created after the write operation is complete, and before another write operation is performed).

As further shown in FIG. 6, process 600 may include creating the snapshot based on the snapshot command (block 630). For example, computing resource 230 may create the snapshot based on the snapshot command. In some implementations, computing resource 230 (e.g., virtualized storage 236) may create the snapshot when computing resource 230 (e.g., hypervisor 238) generates the snapshot command. Additionally, or alternatively, computing resource 236 may create the snapshot when computing resource 230 receives information indicating that computing resource 230 is to create the snapshot from another device (e.g., another computing resource 230, another component of computing resource 230, another device associated with cloud computing environment 220, etc.).

In some implementations, computing resource 230 may create the snapshot based on information that identifies the state of the data volume, maintained by computing resource 230 (e.g., virtualized storage 236), immediately after the write operation has been performed. In some implementations, the snapshot may include a set of reference markers associated with the data volume that may streamline access to the data volume and/or may allow the data volume to be recovered. Additionally, or alternatively, the snapshot may include other information associated with the snapshot, such as a snapshot identifier, information that identifies the data volume, information that identifies virtualized storage 236, information that identifies computing resource 230, information that identifies user device 210, information that identifies the user of user device 210, or the like.

As further shown in FIG. 6, process 600 may include storing the snapshot (block 640). For example, computing resource 230 may store the snapshot created by computing resource 230 in a memory location associated with computing resource 230. In some implementations, computing resource 230 may store the snapshot when computing resource 230 creates the snapshot (e.g., after the snapshot has been created). Additionally, or alternatively, computing resource 230 may store the snapshot when computing resource 230 receives information, indicating that computing resource 230 is to store the snapshot, from another device, such as management device 240 and/or another device associated with cloud computing environment 220.

In some implementations, computing resource 230 may create a snapshot associated with a first component of computing resource 230 (e.g., a data volume maintained by a first virtualized storage 236), and may store the snapshot in a memory location associated with a second component of computing resource 230 (e.g., a second virtualized storage 236). Additionally, or alternatively, another computing resource 230 (e.g., a computing resource 230, included in cloud computing environment 220, other than computing resource 230 associated with creating the snapshot) may store the snapshot.

In some implementations, computing resource 230 may store information associated with the snapshot, such as the snapshot identifier (e.g., the snapshot identifier included in the snapshot command, etc.), a data volume identifier (e.g., a data volume ID, etc.), a computing resource 230 identifier that identifies computing resource 230 and/or one or more components of computing resource 230 associated with the snapshot (e.g., information that identifies virtualized storage 236 associated with the snapshot, information that identifies hypervisor 238 associated with the snapshot, etc.).

As further shown in FIG. 6, process 600 may include providing a information indicating that the snapshot is complete based on storing the snapshot (block 650). For example, computing resource 230 (e.g., virtualized storage 236 and/or hypervisor 238) may provide information indicating the snapshot is complete based on storing the snapshot generated by computing resource 230. In some implementations, computing resource 230 may provide the information when computing resource 230 stores the snapshot (e.g., after computing resource 230 stores the snapshot). Additionally, or alternatively, computing resource 230 may provide the information when computing resource 230 receives information, indicating that computing resource 230 is to provide the information, from another device (e.g., another device included in cloud computing environment 220). In some implementations, the information indicating that the snapshot is complete may include the snapshot identifier (e.g., the snapshot identifier included in the snapshot command and associated with the stored snapshot). Additionally, or alternatively, the information may include some other indication that computing resource 230 has completed (e.g., created and stored) the snapshot.

In some implementations, computing resource 230 may provide the information, indicating that the snapshot is complete, to management device 240 via cloud computing environment 220. Additionally, or alternatively, computing resource 230 may provide the information to management device 240 via one or more components of computing resource 230. For example, a first component of computing resource 230 (e.g., virtualized storage 236) may store the snapshot, and may provide the information to a second component of computing resource 230 (e.g., hypervisor 238), and the second component of computing resource 230 may provide the information to management device 240.

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7A:
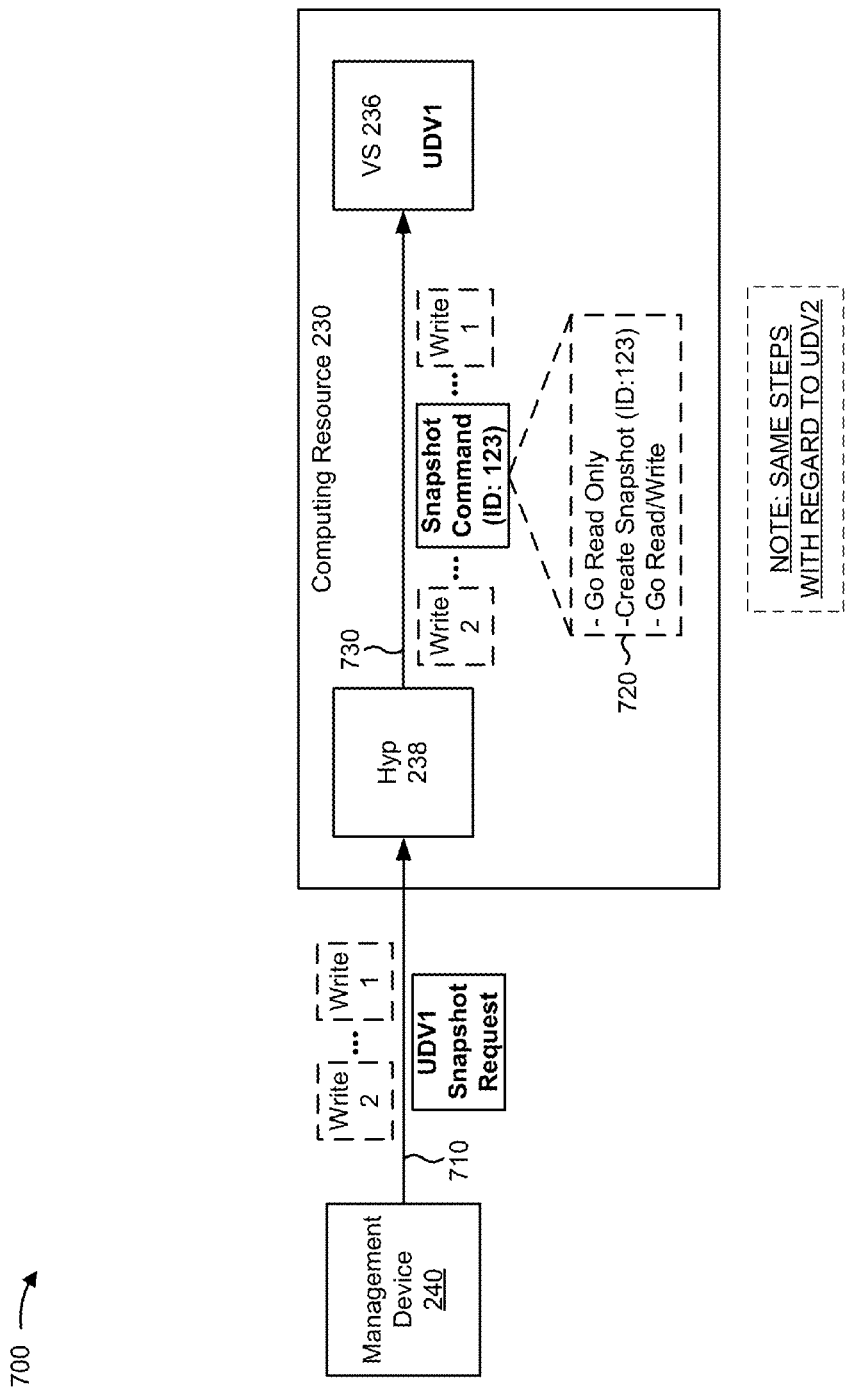
FIGS. 7A and 7B are diagrams of an example implementation relating to the example process shown in FIG. 6.
Figure 7B:
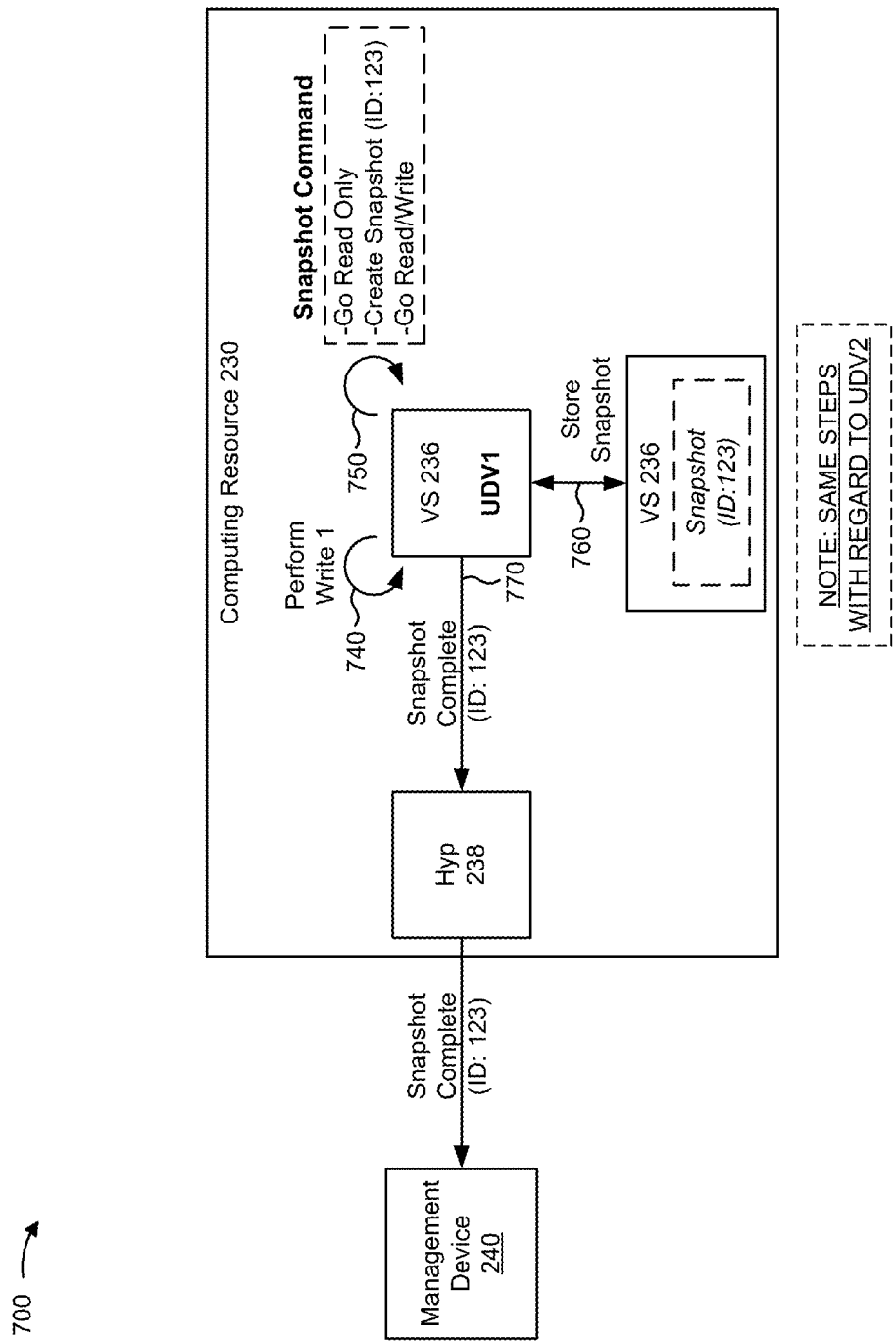

FIGS. 7A and 7B are diagrams of an example implementation 700 relating to example process 600 shown in FIG. 6. For the purpose of example implementation 700, assume that management device 240, associated with a CloudServe cloud computing service, has determined that a snapshot of two data volumes (e.g., a snapshot of a first data volume, identified as UDV1, and a snapshot of a second data volume, identified as UDV2), associated with a user device, identified as UD1, are to be created based on management device 240 receiving information associated with a write operation from UD1. Further, assume that management device 240 has provided a snapshot request to two computing resources 230 (e.g., a first computing resource 230 that maintains UDV1, and second computing resource 230 that maintains UDV2) that indicates that each computing resource 230 may create a snapshot of the respective data volumes. Finally, assume that management device 240 has forwarded information associated with two write operations (e.g., designed to write to the UDV1 and UDV2 data volumes) to the two computing resources 230.

As shown in FIG. 7A, and by reference number 710, a component of computing resource 230, hypervisor 238, may receive the information associated with the two write operations, and may receive the UDV1 snapshot request provided by management device 240. As shown by reference number 720, hypervisor 238 may generate a snapshot command indicating that virtualized storage 236 (e.g., that maintains the UDV1 data volume) is required to enter into a read-only mode before creating the snapshot, indicating that the snapshot is to be identified using snapshot identifier 123, and indicating that virtualized storage 236 may enter a read-write mode after the snapshot has been created. The snapshot command discussed above (e.g., enter read-only mode, create the snapshot, enter read-write mode) is one example of the snapshot command that may be generated by hypervisor 238 (e.g., other examples of the snapshot command are possible).

As shown by reference number 730, hypervisor 238 may insert the snapshot command into a data stream destined for virtualized storage 236 in a manner indicating that the snapshot is required to be created after the first write operation is performed (e.g., when an SLA, associated with the UDV1 data volume, indicates that a snapshot is required to be created after each write operation is complete), and may forward the snapshot command and the information associated with each of the two write operations to virtualized storage 236. Hypervisor 238 may also generate and provide a snapshot command associated with creating a snapshot after the second write operation is performed.

While FIG. 7A is described with regard to the creation of a snapshot of the UDV1 data volume (e.g., maintained by a first computing resource 230), identical steps may occur with regard to the creation of a snapshot of the UDV2 data volume (e.g., maintained by a second computing resource 230).

As shown in FIG. 7B, and by reference number 740 virtualized storage 236 may receive the data stream (e.g., the information associated with the first write operation, the snapshot command, and the information associated with the second write operation), and may perform the first write operation. As shown by reference number 750, virtualized storage 236 may then execute the snapshot command (e.g., enter into a read-only mode, create the snapshot, enter into a read-write mode) provided by hypervisor 238. As shown by reference number 760 virtualized storage 236 may cause the snapshot to be stored (e.g., using the 123 identifier) by another virtualized storage 236 (e.g., associated with computing resource 230). As shown by reference number 770, virtualized storage 236 (e.g., that maintains UDV1) may provide information indicating that the snapshot is complete to hypervisor 238 and hypervisor 238 may provide the information to management device 240.

While, FIG. 7B is described with regard to the creation of a snapshot of the UDV1 data volume (e.g., maintained by a first computing resource 230), identical steps may occur with regard to the creation of a snapshot of the UDV2 data volume (e.g., maintained by a second computing resource 230). In this way, the snapshot (e.g., identified using the 123 identifier), associated with each storage volume, may be created (e.g., after the first write operation) such that the snapshots are identical.

As indicated above, FIGS. 7A and 7B are provided merely as an example. Other examples are possible and may differ from what was described with regard to FIGS. 7A and 7B.

Figure 8:
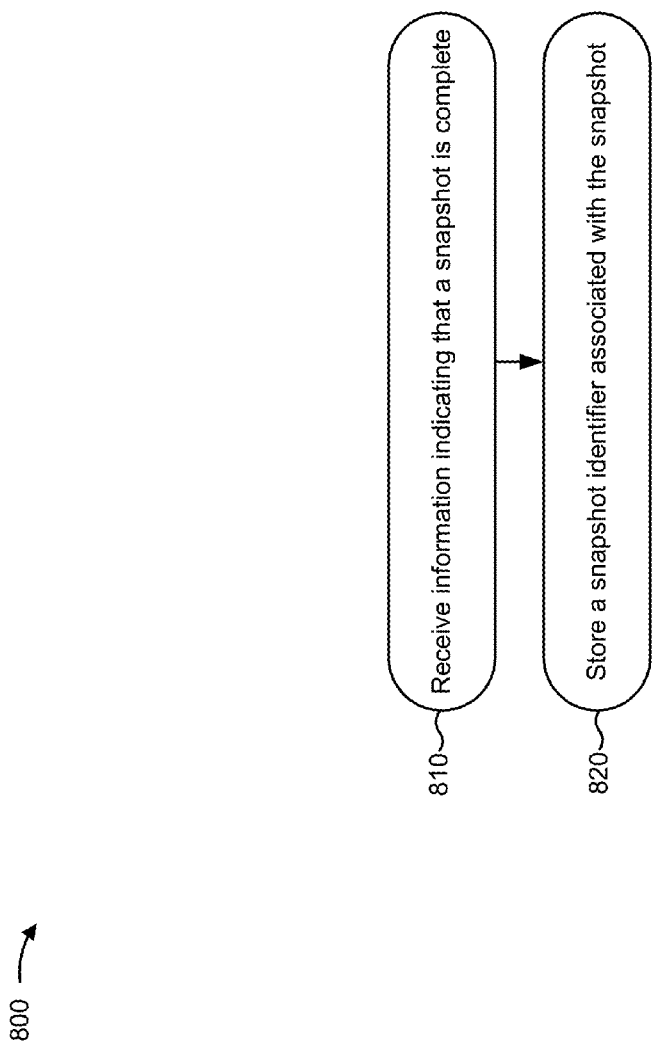
FIG. 8 is a flow chart of an example process for receiving and storing an identifier associated with a snapshot.

FIG. 8 is a flow chart of an example process 800 for receiving information indicating that a snapshot is complete and storing a snapshot identifier associated with the completed snapshot. In some implementations, one or more process blocks of FIG. 8 may be performed by management device 240. In some implementations, one or more process blocks of FIG. 8 may be performed by another device or a group of devices separate from or including management device 240, such as computing resource 230.

As shown in FIG. 8, process 800 may include receiving information indicating that a snapshot is complete (block 810). For example, management device 240 may receive information indicating that a snapshot is complete. In some implementations, management device 240 may receive the information from computing resource 230 (e.g., after computing resource 230 stores the snapshot). Additionally, or alternatively, management device 240 may receive the information from another device associated with cloud computing environment 220.

In some implementations, the information indicating that the snapshot is complete may include the snapshot identifier (e.g., the snapshot identifier included in the snapshot command and used to store the snapshot created by each computing resource). Additionally, or alternatively, the information may include some other indication that computing resource 230 has completed (e.g., created and stored) the snapshot.

In some implementations, management device 240 may not receive information indicating that a snapshot is complete from each computing resource 230 that manages a data volume (e.g., when computing resource 230 experiences an error when creating the snapshot, when computing resource 230 is unable to store the snapshot, etc.), and management device 240 may act accordingly (e.g., resend a snapshot request to each computing resource 230, store information that indicates an error associated with computing resource 230 that failed to complete the snapshot, request computing resource 230, that failed to complete the snapshot, to retry completing the snapshot, etc.).

As further shown in FIG. 8, process 800 may include storing a snapshot identifier (block 820). For example, management device 240 may store a snapshot identifier (e.g., a snapshot identifier included in the information indicating that the snapshot is complete), associated with the snapshot stored by computing resource 230, in a memory location of management device 240. In some implementations, management device 240 may store information associated with the snapshot identifier, such as a data volume identifier (e.g., a string of characters, a data volume ID, etc.) that identifies a data volume associated with the snapshot, and/or a computing resource 230 identifier that identifies computing resource 230 and/or one or more components of computing resource 230 associated with the snapshot identifier (e.g., information that identifies computing resource 230 that sent the snapshot identifier to management device 240).

In some implementations, management device 240 may store the snapshot identifier in a memory location (e.g., a RAM, a hard disk, etc.) of management device 240. Additionally, or alternatively, management device 240 may store the snapshot identifier in a memory location of another device associated with cloud computing environment 220, such as computing resource 230. In this way, management device 240 may be capable of allowing user device 210 and/or another device included in cloud computing environment 220 to access the snapshot (e.g., when user device 210 wishes to clone the data volume, when user device 210 wishes to restore a corrupted data volume based on a previously stored snapshot associated with the data volume, etc.).

Although FIG. 8 shows example blocks of process 800, in some implementations, process 800 may include additional blocks, different blocks, fewer blocks, or differently arranged blocks than those depicted in FIG. 8. Additionally, or alternatively, one or more of the blocks of process 800 may be performed in parallel.

Figure 9:
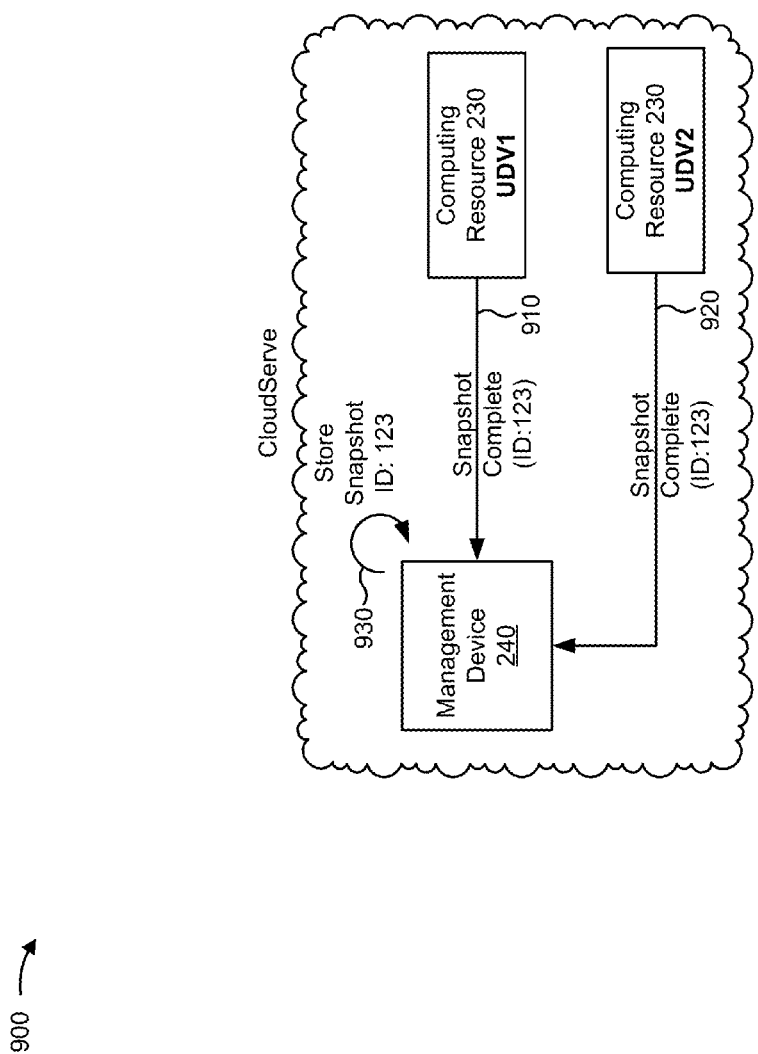
FIG. 9 is a diagram of an example implementation relating to the example process shown in FIG. 8.

FIG. 9 is a diagram of an example implementation 900 relating to example process 800 shown in FIG. 8. For the purpose of example implementation 900, assume that a first computing resource 230, associated with a data volume identified as UDV1, has stored a snapshot of UDV1, and has provided information indicating that the snapshot, identified as 123, associated with the UDV1 snapshot has been completed. Further, assume that a second computing resource 230, associated with a data volume identified as UDV2, has stored a snapshot of UDV2, and has provided information indicating that the snapshot, identified as 123, associated with the UDV2 snapshot has been completed.

As shown in FIG. 9, and by reference number 910, management device 240 may receive information indicating that the UDV1 snapshot is complete, and that the UDV1 snapshot is identified using the 123 identifier. As shown by reference number 920, management device 240 may also receive information indicating that the UDV2 snapshot is complete, and that the UDV2 snapshot is identified using the 123 identifier. As shown by reference number 930, management device 240 may store the 123 snapshot identifier in a memory location of management device 240.

As indicated above, FIG. 9 is provided merely as an example. Other examples are possible and may differ from what was described with regard to FIG. 9.

Implementations described herein may allow a cloud computing service provider to synchronize, via a data link protocol layer associated with a cloud computing environment, the creation of one or more snapshots of one or more data volumes associated with a user. In this way, any synchronized snapshot of a data volume, associated with the user, may be identical to any other synchronized snapshot of any other data volume associated with the user.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations shown in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

As used herein, the term component is intended to be broadly construed as hardware, firmware, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
   one or more devices to:
   receive information associated with a write operation to be performed on a data volume,
   the data volume being maintained by a plurality of cloud resources within a cloud computing environment;
   determine that a snapshot of the data volume is to be created based on receiving the information associated with the write operation;
   enter into a read-only mode;
   generate a snapshot command based on determining that the snapshot is to be created and based on entering into the read-only mode;
   insert the snapshot command, immediately after the information associated with the write operation, into one or more data streams associated with each of the plurality of cloud resources;
   create snapshots at the plurality of cloud resources based on the snapshot command,
   the snapshots being created after the write operation is performed, and
   the snapshot command being issued at each of the plurality of cloud resources to cause the snapshots to be consistent across the plurality of cloud resources;
   enter into a read-write mode based on creating the snapshots; and
   store the snapshots.

2. The system of claim 1, where the one or more devices are further to:
   determine information associated with a service level agreement between a user of the cloud computing environment and a service provider of the cloud computing environment; and
   where the one or more devices, when determining that the snapshot of the data volume is to be created, are to:
   determine that the snapshot of the data volume is to be created based on the information associated with the service level agreement.

3. The system of claim 1, where the one or more devices are further to:
   receive, from a user device associated with the write operation, information indicating that the snapshot of the data volume is to be created; and
   where the one or more devices, when determining that the snapshot of the data volume is to be created, are to:
   determine that the snapshot of the data volume is to be created based on the information received from the user device.

4. The system of claim 1, where the one or more devices are further to:
   provide a snapshot request based on determining that the snapshot of the data volume is to be created; and
   where the one or more devices, when generating the snapshot command, are to:
   generate the snapshot command based on the snapshot request.

5. The system of claim 1, where the snapshot command includes at least one of:
   information indicating that a cloud resource, of the plurality of cloud resources, is to create the snapshot of the data volume; or
   information indicating that a cloud resource, of the plurality of cloud resources, is to enter a read-write mode after creating the snapshot of the data volume.

6. The system of claim 1, where the one or more devices when, storing the snapshots, are to:
   receive a snapshot identifier,
   the snapshot identifier being associated with a snapshot created by a cloud resource of the plurality of cloud resources; and
   store the snapshot identifier.

7. The system of claim 1, where the one or more devices are further to:
   restore a corrupted data volume based on the snapshot of the data volume.

8. A non-transitory computer-readable medium storing instructions, the instructions comprising:
    one or more instructions that, when executed by one or more processors, cause the one or more processors to:
        receive information associated with a write operation to be performed on a data volume,
            the data volume being maintained by a plurality of cloud resources within a cloud computing environment;
        determine that a snapshot of the data volume is to be created based on receiving the information associated with the write operation;
        enter into a read-only mode;
        generate a snapshot command based on determining that the snapshot is to be created and based on entering into the read-only mode;
        insert the snapshot command, immediately after the information associated with the write operation, into one or more data streams associated with each of the plurality of cloud resources;
        create snapshots at the plurality of cloud resources based on the snapshot command,
            the snapshots being created after the write operation is performed, and
            the snapshot command being issued at each of the plurality of cloud resources to cause the snapshots to be consistent across the plurality of cloud resources;
        enter into a read-write mode based on creating the snapshots; and
        store the snapshots.

9. The non-transitory computer-readable medium of claim 8, where the one or more instructions, when executed by the one or more processors, further cause the one or more processors to:
    determine information associated with a service level agreement between a user of the cloud computing environment and a service provider of the cloud computing environment; and
    where the one or more instructions, when determining that the snapshot of the data volume is to be created, cause the one or more processors to:
        determine that the snapshot of the data volume is to be created based on the information associated with the service level agreement.

10. The non-transitory computer-readable medium of claim 8, where the one or more instructions, when executed by the one or more processors, further cause the one or more processors to:
    receive, from a user device associated with the write operation, information indicating that the snapshot of the data volume is to be created; and
    where the one or more instructions, when determining that the snapshot of the data volume is to be created, cause the one or more processors to:
        determine that the snapshot of the data volume is to be created based on the information received from the user device.

11. The non-transitory computer-readable medium of claim 8, where the one or more instructions, when executed by the one or more processors, further cause the one or more processors to:
    provide a snapshot request based on determining that the snapshot of the data volume is to be created; and
    where the one or more instructions, when generating the snapshot command, cause the one or more processors to:
        generate the snapshot command based on the snapshot request.

12. The non-transitory computer-readable medium of claim 8, where the snapshot command includes at least one of:
    information indicating that a cloud resource, of the plurality of cloud resources, is to create the snapshot of the data volume; or
    information indicating that a cloud resource, of the plurality of cloud resources, is to enter a read-write mode after creating the snapshot of the data volume.

13. The non-transitory computer-readable medium of claim 8, where the one or more instructions, when storing the snapshots based on executing the snapshot command, cause the one or more processors to:
    receive a snapshot identifier,
        the snapshot identifier being associated with a snapshot created by a cloud resource of the plurality of cloud resources; and
    store the snapshot identifier.

14. The non-transitory computer-readable medium of claim 8, where the one or more instructions, when executed by the one or more processors, further cause the one or more processors to:
    receive information, from the plurality of cloud resources, indicating that the snapshots are complete.

15. A method, comprising:
    receiving, by one or more devices, information associated with a write operation to be performed on a data volume,
        the data volume being maintained by a plurality of cloud resources within a cloud computing environment;
    determining, by the one or more devices, that a snapshot of the data volume is to be created based on receiving the information associated with the write operation;
    entering, by the one or more devices, into a read-only mode;
    generating, by the one or more devices, a snapshot command based on determining that the snapshot is to be created and based on entering into the read-only mode;
    inserting, by the one or more devices, the snapshot command, immediately after the information associated with the write operation, into one or more data streams associated with each of the plurality of cloud resources;
    creating, by the one or more devices, snapshots at the plurality of cloud resources based on the snapshot command,
        the snapshot being created after the write operation is performed, and
        the snapshot command being issued at each of the plurality of cloud resources to cause the snapshots to be consistent across the plurality of cloud resources;
    entering, by the one more devices, into a read-write mode based on creating the snapshots; and
    storing, by the one or more devices, the snapshots.

16. The method of claim 15, further comprising:
    determining information associated with a service level agreement between a user of the cloud computing environment and a service provider of the cloud computing environment; and
    where determining that the snapshot of the data volume is to be created comprises:

determining that the snapshot of the data volume is to be created based on the information associated with the service level agreement.

17. The method of claim 15, further comprising:
providing a snapshot request based on determining that the snapshot of the data volume is to be created; and
where generating the snapshot command comprises:
generating the snapshot command based on the snapshot request.

18. The method of claim 15, where the snapshot command includes a plurality of:
information indicating that a cloud resource, of the plurality of cloud resources, is to create the snapshot of the data volume; or
information indicating that a cloud resource, of the plurality of cloud resources, is to enter a read-write mode after creating the snapshot of the data volume.

19. The method of claim 15, where storing the snapshot based on executing the snapshot command comprises:
receiving a snapshot identifier,
the snapshot identifier being associated with a snapshot created by a cloud resource of the plurality of cloud resources; and
storing the snapshot identifier.

20. The method of claim 15, further comprising:
determining, by the one or more devices, the data volume has been corrupted;
accessing, by the one or more devices, the snapshot of the data volume; and
restoring, by the one or more devices, the data volume based on the snapshot of the data volume.

\* \* \* \* \*